June 21, 1966  J. S. KAMBORIAN  3,256,544
APPLICATION OF LUBRICANT FOR A LASTING OPERATION
Filed Jan. 7, 1963  12 Sheets-Sheet 1

FIG.-1

INVENTOR
Jacob S. Kamborian
BY Albert Gordon ATTY

June 21, 1966  J. S. KAMBORIAN  3,256,544
APPLICATION OF LUBRICANT FOR A LASTING OPERATION
Filed Jan. 7, 1963  12 Sheets-Sheet 6

June 21, 1966  J. S. KAMBORIAN  3,256,544
APPLICATION OF LUBRICANT FOR A LASTING OPERATION
Filed Jan. 7, 1963  12 Sheets-Sheet 11

United States Patent Office 3,256,544
Patented June 21, 1966

3,256,544
APPLICATION OF LUBRICANT FOR A LASTING OPERATION
Jacob S. Kamborian, 133 Forest Ave., West Newton, Mass.
Filed Jan. 7, 1963, Ser. No. 249,793
15 Claims. (Cl. 12—145)

It is conventional practice in a lasting operation to provide a last having a shoe insole located on its bottom and an upper draped thereon with the lasting margin of the upper extending away from the last and moving a wiper across the bottom of the last so that a wiping surface on the wiper intersects the lasting margin and applies pressure against the outer surface of the margin so as to wipe or fold the margin against the insole. It has been found that due to the pressures generated during wiping the wiper applies a pull on the margin which frequently creates sufficient tension in the portion of the upper above the lasting margin that is exposed in the completed shoe as to create breaks or cracks therein. In the instant invention this disability is overcome by the application of a lubricant to either the wiper surface or the margin surface so as to lessen the coefficient of friction between these surfaces.

The invention is disclosed as being incorporated in the pulling over and toe lasting machine of pending application Serial No. 231,756 filed October 19, 1962. This machine includes a support for supporting bottom-down a shoe assembly that includes a last having an insole located on its bottom and an upper draped about its toe end. The support is mounted for heightwise movement and forwardly movable wipers are provided that are movable across the bottom of the insole. The machine also includes a pincers formed of a lower and upper jaw, which jaws are relatively movable and are located adjacent the toe of the last. In the operation of the machine the support is initially located to position the bottom of the insole below the upper surface of the wipers. The jaws of the pincers are closed about the toe end of the lasting margin and the pincers are moved downwardly to stretch the toe of the upper about the last. This is followed by a concurrent raising of the support and pincers to a level that places the bottom of the insole above the upper surface of the wipers, a forward movement of the wipers to wipe the lasting margin against the insole and an opening of the pincers jaws to release the lasting margin.

In one embodiment of the invention, the machine has been modified by providing a conduit through the upper pincers jaw which is connected to a source of lubricant. The control of the machine has been modified so that lubricant is extruded through the conduit onto the outer surface of the lasting margin at the same time as the jaws close on the lasting margin.

The machine also includes a deformable shoe conforming yoke located above the wipers that has a bight and a pair of legs extending forwardly and divergently of the bight. The yoke snugly conforms the upper to the shape of the last during the rise of the support. In a second embodiment of the invention, a nozzle is placed in a recess in the bight above the upper surfaces of the wipers and means are provided to extrude lubricant through the nozzle onto the upper wiper surfaces prior to the forward, wiping movement of the wipers.

In the accompanying drawings.

Figure 1:
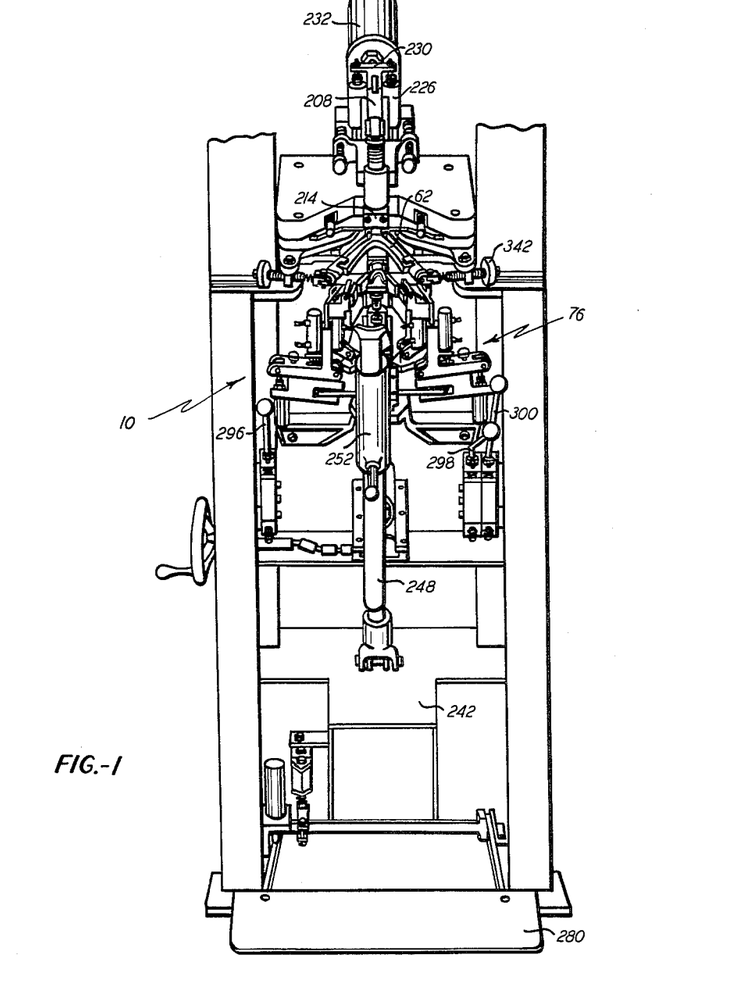
FIG. 1 is a front elevation of the machine.

The machine comprises a frame 10 (FIGURES 1 and 2) that includes inclined struts 12 and an inclined block 14. The machine is inclined approximately 30° from the vertical so that the operator may more readily have access thereto, but, for the sake of convenience, parts extending in the direction of the struts 12 will be referred to as extending vertically and parts extending in the direction of the block 14 will be referred to as extending horizontally.

Figure 4:
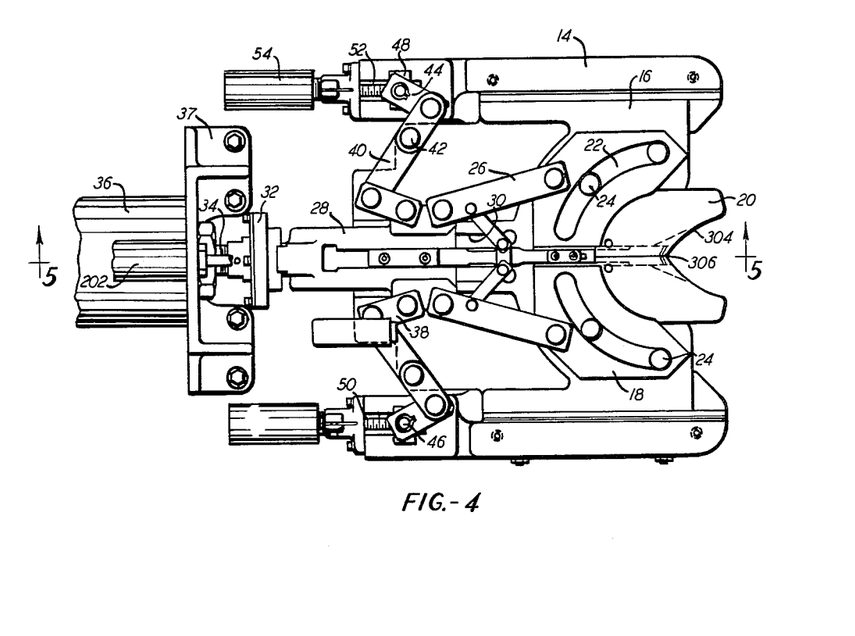
FIG. 4 is a plan view of the wipers and wiper driving mechanism.
Figure 5:
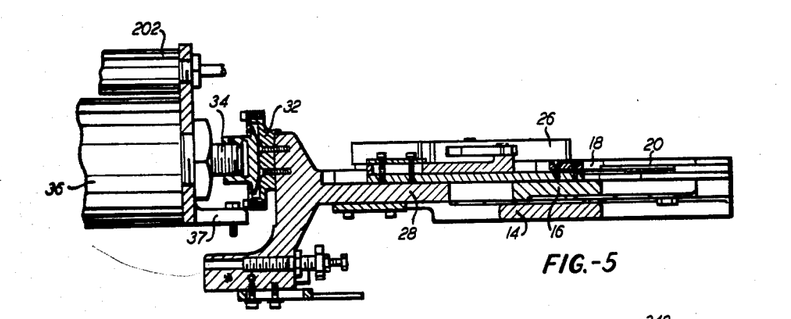
FIG. 5 is a section taken on the line 5—5 of FIG. 4.

Referring to FIGS. 4 and 5, a wiper supporting plate 16 is slidably mounted in the block 14 for horizontal movement. The plate 16 supports wiper holding cam plates 18 containing recesses in their forward ends in which are secured wiper blades 20. The cam plates 18 have arcuate cam slots 22 which engage pins 24 fixed to the subjacent plate 16 for controlling movement of the cam plates and hence movement of the wiper blades to close them about the toe of a shoe. The forward ends of a pair of wiper actuating links 26 are pivotally connected to the cam plates. The rear ends of the links 26 are pivotally connected to a block 28 slidable in a slot 30 in the plate 16. The block 28 is connected by way of a coupling 32 at its rear end to a piston rod 34 projecting from an air actuated motor 36 mounted on a flange 37 secured to the frame 10. The block 28 has pivotally connected thereto a pair of short links 38 which extend rearwardly and to the rear ends of which are pivotally connected a pair of laterally extending levers 40, which in turn are pivotally connected intermediate their ends to the plate 16 by pivots 42. The outermost ends of the levers 40 are pivotally connected to links 44 and the rear ends of the links 44 are pivotally connected to pivots 46. Each pivot 46 has a head 48 dependent therefrom that is slidably received in a slot 50 located in the block 14. The piston rod 52 of an air actuated motor 54 mounted on the block 14 is secured to each head 46. Air is provided from a source (not shown) to the motors 54 to cause the heads 48 to be yieldably urged forwardly in the slots 50.

Figure 2:
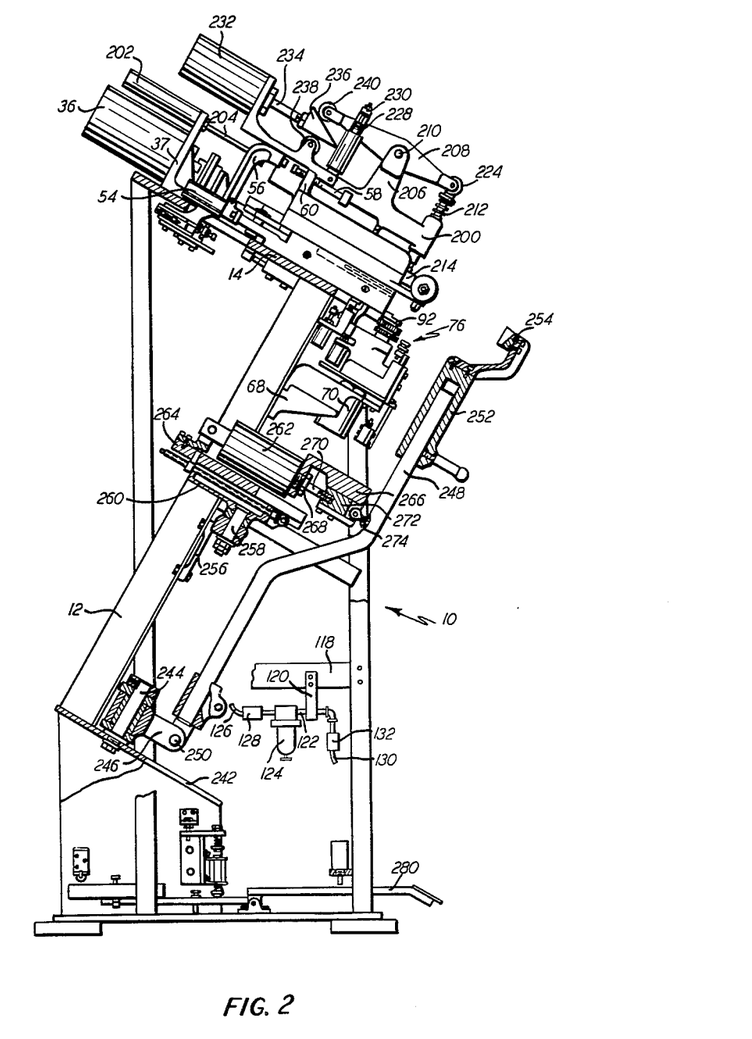
FIG. 2 is a side elevation of the machine.

The plate 16 has a projection 56 extending upwardly of its rear end, FIG. 2. A button on the projection 56 is in alignment with a stud 58 threaded into a projection 60 on the frame 10.

Figure 3:
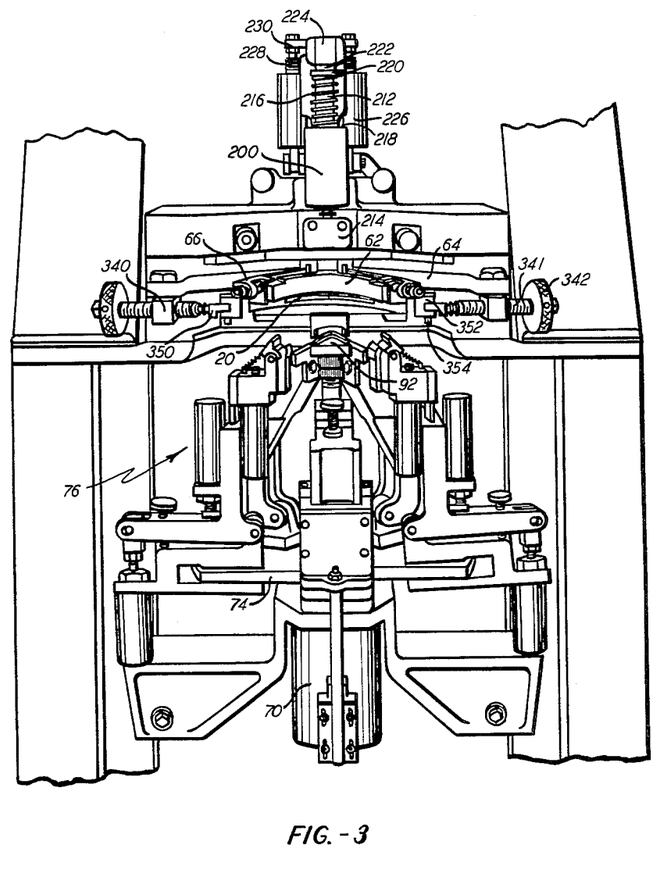
FIG. 3 is a front elevation to an enlarged scale, of the upper portion of the machine.
Figure 6:
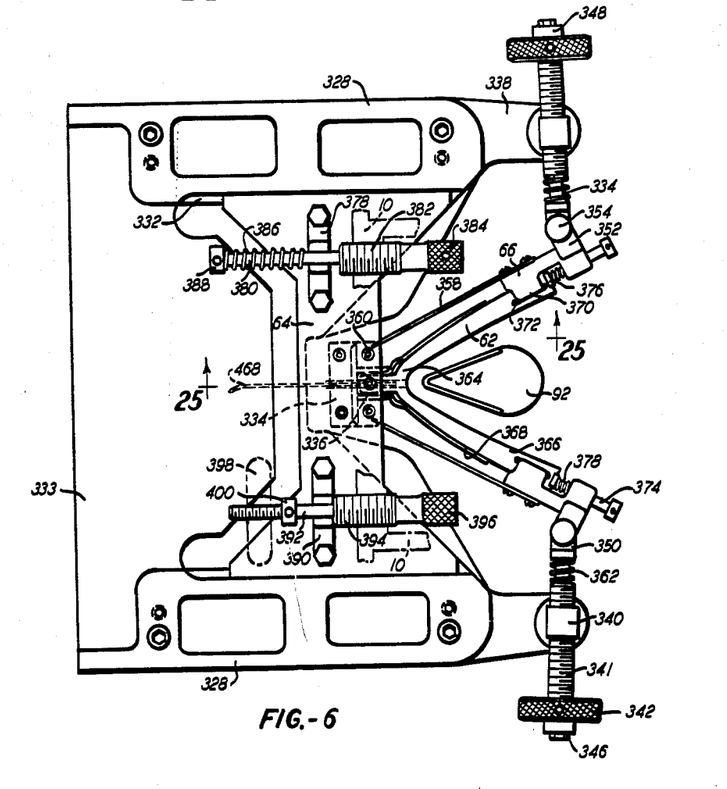
FIG. 6 is a plan view of the shoe conforming yoke and its mounting.
Figure 25:
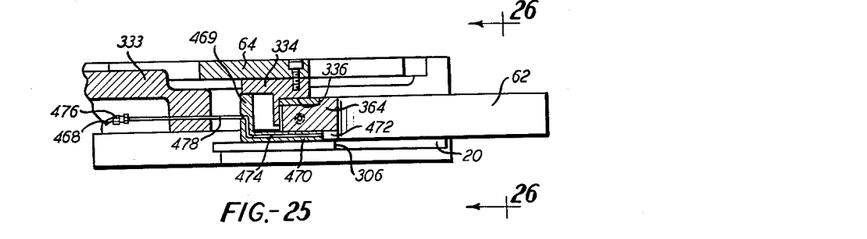
FIG. 25 is a section showing the lubricant extruding nozzle in a recess in the bight of the shoe conforming yoke, taken on the line 25—25 of FIG. 6.

The frame 10 is formed into two spaced brackets 328 located above the wipers 20 and wiper cams 18 (see FIGS. 6 and 25). A cross plate 64 extends between the brackets 328 and is slidably mounted for forward and rearward movement in gibs 332 located in the brackets 328. A beam 333 extends between the brackets 328 rearwardly of the crossplate 64. A mounting bracket 334, bolted to the underside of the cross plate 64, has a socket 336 at its forward end. A flange 338 extends forwardly of each bracket 328. An internally threaded sleeve 340 is pivotally connected to each flange 338. A threaded shaft 341 is threaded into each sleeve 340, and a knob 342 is rigidly connected to each shaft 341. Each shaft 341 is hollow and slidably receives a rod 344 extending longitudinally therethrough. Adjusting nuts 346 are threaded to the outer ends of the rods 341 and bear against bearings 348 rotatably mounted on the rods 341. The bearings 348 in turn bear against the knobs 342. The inner end of each rod 341 is formed into a head 350 (see FIG. 3) that extends between the jaws of a clevis 352 and is pivoted to the clevis by a pivot pin 354. Each clevis 352 forms an end of a support arm 66, and each support arm 66 has a spring arm 358 secured thereto and extending rearwardly thereof. The rear ends of the spring arms 358 are each entwined about a pin 360, which pins 360 are mounted on the mounting bracket 334 on opposite sides of the ratchet 336. A compression spring 362 is mounted on each rod 334 and extends from each shaft 341 to each head 350.

A substantially U-shaped shoe conforming yoke 62 is provided having a bight 364 and a pair of legs 366 extending forwardly of the bight on opposite sides of the bight. The yoke is made of a flexible, deformable material such as Teflon and has a pair of bowed springs 368 extending exteriorly of each yoke leg from the bight thereof.

The bight of the yoke is received in the socket 336, above the wipers 20, and each support arm 66 has a downturned lip 370 that is received in an elongated slot 372 in a yoke leg 366. The slots 372 are made larger than the lips 370. A pin 374 mounted in each support arm 66 has a clip 376 thereon that bears against a yoke leg 366. Each pin 376 is yieldably urged forwardly by a compression spring 378 to yieldably urge the yoke legs forwardly and thereby seat the yoke bight 364 against the socket 336.

The cross plate 64 has a trough 378 extending upwardly thereof in which a rod 380 is slidably received. The rod 380 has a threaded extension 382 that is threaded into the machine frame 10 and a knurled knob 384 at its forward end. A compression spring 386 is coiled about the rod 380 and extends between the trough 378 and an enlarged head 388 at the rear end of the rod 380. A second trough 390 mounted on the cross plate 64 has a rod 392 slidable thereon. The forward end of the rod 392 is slidably received in a hollow stud 394 that is threaded into the machine frame 10 and has a knurled knob 396 at its forward end. The rear end of the rod 392 is threaded into a hanger 398 depending from the machine frame 10, and a collar 400 is pinned to the rod 392 intermediate the hanger 398 and the trough 390.

A mounting bracket 68, forming part of the frame 10, extends forwardly below the wipers 20 and the yoke 62 (see FIGS. 2 and 10). An air actuated motor 70 is secured to the bracket 68 and has a piston rod 72 that is secured to the base plate 74 of an upper gripping head 76. A guide bar 78 is secured to and extends upwardly of the bracket 68 through the head 76. A horizontally extending lip 80, at the upper end of the guide bar 78, has a screw 82 threaded therein that is positioned above a horizontally extending flat 84 on the head 76. A lock nut 86 adjustably positions the screw in the lip. The head 76 includes a cover plate 88 and gibs 90 that extend part way around the bar 78. A toe rest 92 is adjustably secured to the top of the head 76.

Figure 7:
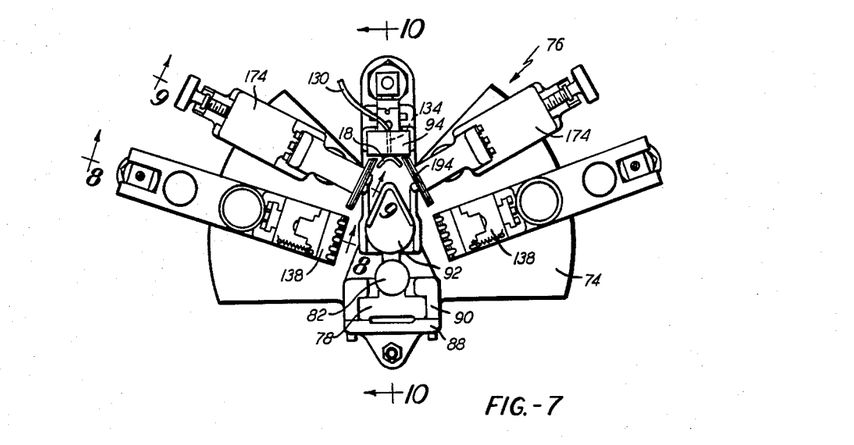
FIG. 7 is a plan view of an upper gripping head.
Figure 10:
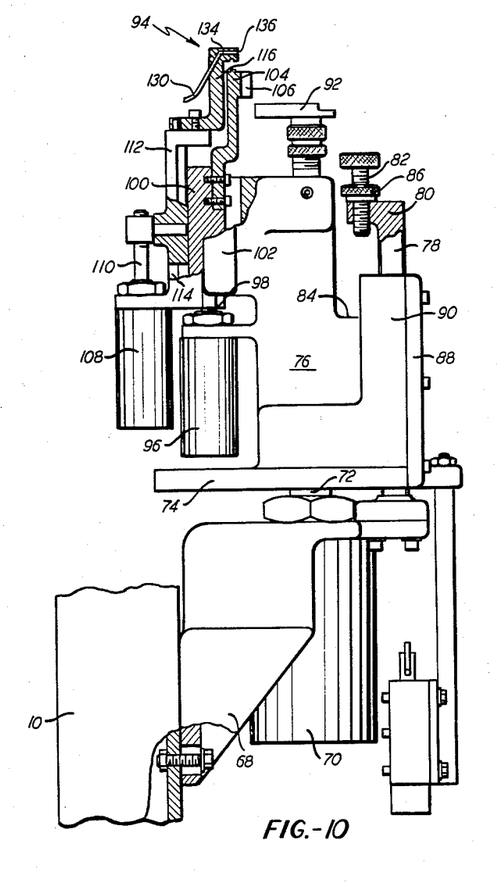
FIG. 10 is a view taken on the line 10—10 of FIG. 7.

Referring to FIGS. 7 and 10, a front pincers 94 is located at the rear of the head 76 on the median line of the machine. The pincers 94 comprises an air actuated motor 96 that is secured to the rear of the head 76. The piston rod 98 of the motor 96 is connected to a front pincers bracket 100 that is slidably guided for vertical movement in gibs 102 on the rear of the head 76. The bracket 100 has a stationary pincers jaw 104 extending upwardly thereof that has a forwardly directed concave gauge surface 106. An air actuated motor 108, secured to the bracket 100, has a piston rod 110 that is connected to a bracket 112 which is slidably guided in gibs 114 in the bracket 100. The bracket 112 has a movable pincers jaw 116 secured thereto.

Referring to FIG. 2, the frame 10 includes a bar 118 that has a hanger 120 depending therefrom. A pipe 122, threaded into the hanger 120, is secured to an air line lubricator 124. An air line 126 passes through a check valve 128 into the lubricator, and the exit side of the lubricator is in communication with a tube 130 that passes through a flow control valve 132. The tube 130 extends into a port 134 located in the jaw 116. The port 134 intersects the rear face 136 of the jaw 116, so that the jaw 116 acts as a nozzle.

Figure 8:
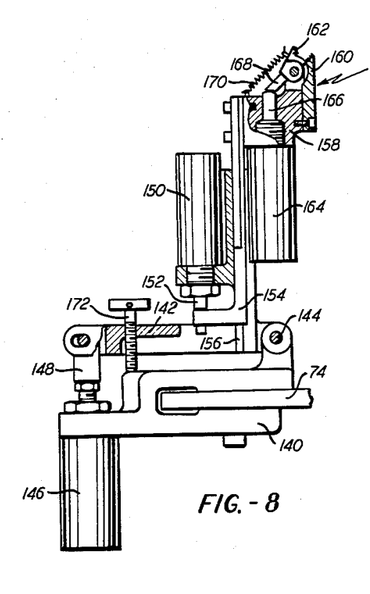
FIG. 8 is a view taken on the line 8—8 of FIG. 7.

Side pincers 138 are mounted on the plate 74 forwardly of the pincers 94 and on opposite sides of the toe rest 92. Referring to FIG. 8, each pincers 138 includes a support 140 anchored to the plate 74. An L-shaped angle 142 is pivoted adjacent its apex by a pivot 144 to each support 140. An air actuated motor 146, secured to each support 140, has a piston rod 148 that is connected to the prone leg of each angle 142. The upright leg of each angle 142 has an air actuated motor 150 secured thereto. The piston rod 152 of each motor 150 is connected to a slide 154 that is slidably guided for heightwise movement in gibs 156 formed in the upright leg of each angle 142. A bracket 158 is secured to the upper part of each slide 154, and a stationary pincers jaw 160 is connected to each bracket 158. A movable pincers jaw 162 is pivoted to each bracket 158. An air actuated motor 164, anchored in each bracket 158, has a piston rod 166 that bears against a stem 168 formed on each movable jaw 162. A tension spring 170, extending between each jaw 162 and each bracket 158, serves to urge each stem 168 against a piston rod 166. A stud 172 is threaded into the prone leg of each angle 142 and is adapted to bear against a support 140.

Figure 9:
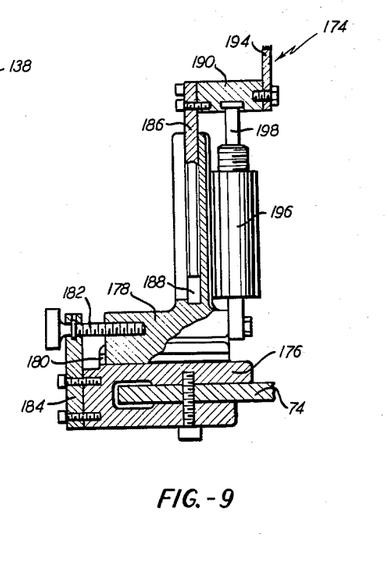
FIG. 9 is a view taken on the line 9—9 of FIG. 7.

A retarder 174 is mounted on the plate 74 between the front pincers 94 and each side pincers 138. Referring to FIG. 9, each retarder comprises a support 176 anchored to the plate 74. A block 178 is slidably guided in gibs 180 on the support 176. A stud 182, rotatably mounted in a plate 184 secured to the support 176, is threaded into the block 178 whereby the position of the block in the gibs may be adjusted by rotation of the stud. A slide 186 is slidably mounted for vertical movement in gibs 188 formed on the block 178. A bracket 190 is secured to the top of slide 186, and a retarder blade 194 is secured to and extends upwardly of the bracket 190. An air operated motor 196 is secured to the block 178. The piston rod 198 of the motor 196 is connected to the bracket 190.

A slide 200 (FIG. 2) is slidably mounted for horizontal movement in the uppermost portion of the frame 10. An air actuated motor 202, mounted on the flange 37, has a piston rod 204 connected to the slide 200 to thereby effect its horizontal movement. A fulcrum 206 extends upwardly of the slide 200, and a lever 208 is pivotally connected to the fulcrum by a pivot 210 to swing about a horizontal axis. A toe clamp holder 212 (FIGS. 2 and 3) extends through a vertical hole in the forward end of the slide 200 and is keyed to the slide to permit vertical movement of the toe clamp holder in the slide without permitting rotation of the holder about its vertical axis. A toe clamp 214 is connected to the holder 212 in a manner that permits swinging movement of the toe clamp about a horizontal axis that is transverse to the longitudinal center line of the machine. A compression spring 216, coiled about the holder 212 and interposed between a shoulder 218 on the slide 200 and a head 220 on the holder 212, acts to yieldably urge the holder 212 upwardly of the slide 200. A button 222 is secured to the top of the holder 212.

The forward end of the lever 208 has a roller 224 rotatably mounted thereon that is adapted to bear against the button 222 and thereby limit the extent of upward movement of the toe clamp 214 under the influence of the spring 216. A pair of air actuated motors 226 are pivoted to the slide 200 rearwardly of the fulcrum 206 and extend upwardly of the slide. Each motor 226 has a piston rod 228 that is secured to a ledge 230 extending outwardly of the lever 208. An air actuated motor 232 is secured to the rear end of the slide 200 and has a piston rod 234 extending forwardly thereof. A wedge shaped cam 236 secured to the piston rod 234 is interposed between a roll 238 rotatably mounted on the slide 200 and a roll 240 rotatably mounted on the rear end of the lever 208.

The frame 10 includes a platform 242 (FIGS. 1 and 2) that has a pin 244 extending upwardly thereof. A lug 246 is swivelled on the pin 244 for swinging movement about the axis of the pin and a post 248 is pivoted to the lug 246 by a pivot 250 for swinging movement with respect to the lug about a horizontal axis. The upper end of the post 248 is fitted into a heel clamp holder 252 and a heel clamp 254 is secured to the heel clamp holder 252.

A bracket 256, secured to the strut 12, has a pin 258 secured thereto and extending upwardly thereof that is coaxial with the pin 244 (FIG. 2). A bracket 260 is pivotally mounted on the pin 258 for swinging movement about the axis of the pin. An air actuated motor 262 is pivoted to a plate 264, which plate is mounted on the bracket 260. The motor 262 has a block 266 secured thereto by a fastener 268. The piston rod 270 of the motor 262 has a plunger 272 secured thereto, and the plunger is slidable in a hole in the block 266. The forward end of the plunger 272 is pivoted to a link 274 and the link 274 is connected to the post 248.

An automatically operated pneumatic control system, more fully described in the aforementioned application Serial No. 231,756, is provided to cause the machine to go through a cycle. The system is actuated by a foot controlled pedal 280 (FIGS. 1 and 2) that is pivoted to the frame.

In the operation of the machine, a last 282 is provided having an insole 284 secured to its bottom and an upper 286 draped over its toe (FIGS. 13, 13A, 13B and 13C). The upper has preferably been previously heel seat lasted by a heel seat lasting machine such as that disclosed in application Serial No. 107,156, filed May 2, 1961, now Patent No. 3,189,924. At this time the wipers 20 are held in their retracted position by the motor 26, the slide 200 is held in a retracted position by the motor 202 to maintain the toe clamp 214 in a rearward out-of-the-way position, the spring 216 holds the toe clamp 214 in an upper position due to the retraction of the piston rod 234 in the motor 232 and the retraction of the piston rods 228 in the motors 226, the gripping head 76 is in a lowered position due to the retraction of the piston rod 72 in the motor 70, the toe pincers 94 is in an elevated position with respect to the head 76 due to the projection of the piston rod 98 out of the motor 96, the jaws 104 and 116 of the pincers 94 are open due to the projection of the piston rod 110 out of the motor 108, the side pincers 138 are in an elevated position with respect to the head 76 due to the retraction of the piston rods 152 in the motors 150, the jaws 160 and 162 of the pincers 138 are open due to the retraction of the piston rods 166 in the motors 164, the pincers 138 are in an outward position due to the retraction of the piston rods 148 in the motors 146, the retarder blades 194 are in a lowered position with respect to the head 76 due to the retraction of the piston rods 198 in the motors 196, and the heel clamp 254 is swung to a forward position due to the projection of the piston rod 270 from the motor 262.

The last, upper and insole assembly is now presented bottom down to the machine with the insole 284 resting on the toe rest 92, the toe of the last bearing against the gage 106, the margin of the toe portion of the upper 286 inserted between the jaws of the pincers 94, and the forepart portions of the upper margin inserted between the jaws of the pincers 138. At this time the parts assume the position shown in FIGS. 13, 13A, 13B and 13C. The pincers 94 and 138 are at a level that is above the toe rest 92 and below the wipers 20 and yoke 62, and the pincers 94 are at a somewhat higher level than the pincers 138.

Figure 11:
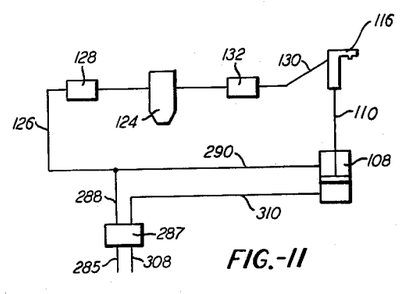
FIG. 11 is a schematic representation of a means for extruding the lubricant through the conduit in the pincers jaw.
Figure 14:
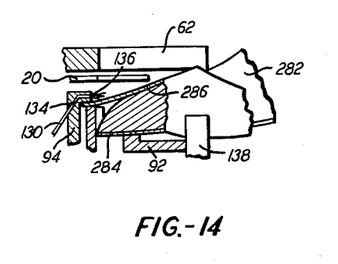
FIG. 14 is a schematic representation of the shoe in the machine when the lubricant is sprayed onto the shoe upper through the conduit in the pincers jaw.

The operator now depresses the pedal 280 to actuate the control circuit for the machine to cause air to pass from a line 285, through a valve 287, a line 288, through a line 290 to the motor 108 (see FIG. 11) to actuate the motor 108 to lower the piston rod 110 and thereby lower the jaw 116 of the front pincers 94 to close the front pincers on the upper margin. At the same time, air passes from the line 288, the line 126 and the check valve 128 into the lubricator 124, which is filled with a suitable lubricant such as liquid petroleum jelly, to cause a mixture of air and lubricant to pass from the lubricator 124 through the tube 130 and the port 134 to be sprayed forwardly of the rear face 136 of the jaw 116 onto the outer surface of the upper 286 adjacent the tip end of the upper 286 (see FIG. 14). For reasons set forth below, the portion of the upper sprayed by the lubricant is that portion which is subsequently engaged by the wipers 20 during the wiping operation and is layed in against the insole 284. The motor 96 is then actuated to lower the pincers 94 and thereby stretch the upper about the toe of the last. Because of the yieldable nature of the air actuated motor 96, the pincers 94 is lowered until the resistance to movement of the upper exceeds the driving force of the motor.

The motors 164 are now actuated to close the side pincers 138 on the forepart portions of the upper margin. This is followed by an actuation of the motors 150 to cause the side pincers 138 to be lowered to thereby stretch the forepart portions of the upper about the last. Due to the yieldable nature of the air actuated motors 150, when the resistance to stretching of the upper exceeds the driving force of the motors the downward movement of the pincers 138 terminate. During the downward movement of the pincers 138, the pincers and the angles 142 swing to some extent about the pivots 144. At the conclusion of the downward movement of the pincers 138, they are positioned outwardly of and below the bottom of the insole 284 with the margin of the upper 286 gripped by the pincers substantially perpendicular to the plane of the last bottom. The swinging movement of the angles 142 can take place because the motors 146 are exhausted at this time.

Figure 15:
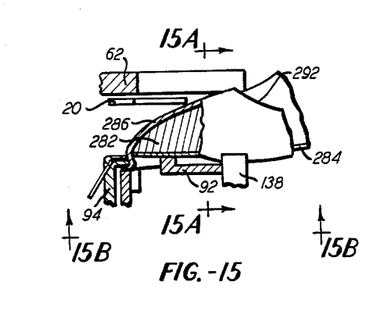
FIG. 15 is a schematic representation of the shoe assembly in the machine after the upper has been stretched about the last by the pincers.
Figure 15A:
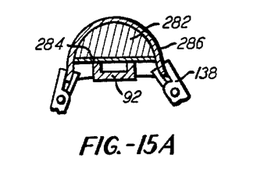
FIG. 15A is a view taken on the line 15A—15A of FIG. 15.
Figure 15B:
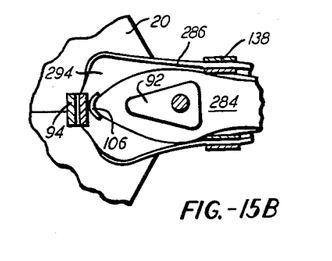
FIG. 15B is a view taken on the line 15B—15B of FIG. 15.

The machine parts maintain the posture they have reached at this time as shown in FIGS. 15, 15A and 15B.

The above described sequence of movements of the pincers 94 and 138 causes the front pincers 94 to stretch the upper tightly over the toe of the last before the forepart portions of the upper are stretched over the last by the side pincers 138. It has been found that this sequence, by stretching the upper to its fullest extent in the direction of the toe of the last prior to the stretching action of the side pincers, enables the forepart portions of the upper to have no components of motion in the direction of the toe when they are pulled downwardly by the side pincers and thus provides for a tight conformity of the upper to the last with the top line 292 (FIG. 15) of the upper tightly stretched on the last. The portions of the upper margin between the pincers 94 and 138 are outspread into dog ears 294 (FIG. 15B) that lie beneath the wipers 20.

The operator may at this time inspect the upper on the last, and if he finds that the top line 292 is not properly centered on the last he may manipulate control levers 296, 298 and 300 (FIG. 1) mounted on the machine to selectively increase or decrease the downwardly directed force of the motors 96 and 150 to thereby selectively and individually increase or diminish the downwardly directed pressures of the pincers 94 and 138 and thereby reposition the upper about the last if this is necessary. Reference is made to the aforementioned application Serial No. 231,756 for a fuller disclosure of this mechanism.

The operator now depresses the pedal 280 further. This causes the actuation of the motor 70 to raise the upper gripping head 76. At the same time the motors 196 are actuated to raise the retarder blades 194 at a faster rate than the rate of upward movement of the gripping head. At this time a locking mechanism is operated to lock the pedal 280 in its down position to enable the operator to take his foot off the pedal without affecting the automatic operation of the machine.

Prior to the operation of the machine, the yoke 62 had been adjusted for the style and size of the shoe to be lasted in the manner described in application Serial No. 193,-829 filed May 10, 1962. The screw 82 had been adjusted so that it will bear against the flat 84 on the gripping head 76 and thus stop the upward movement of the gripping head by the motor 70 when the bottom of the insole 284 supported on the toe rest 92 has risen to a level above the upper surface of the wipers 20 by an amount that is substantially equal to the lasting margin of the upper. This arrangement ensures a raising of the shoe to this desired level regardless of the heightwise dimension of the last and the thickness of the insole.

The raising of the retarder blades 194 during the upward movement of the gripping head 76 causes the retarder blades to engage the dog ears 294 and press them against the bottoms of the wipers 20 at about the time the bottom of the insole has reached the level of the bottoms of the wipers. During the subsequent movement of the gripping head 76 to the positions indicated in FIGS. 16 and 16B the engagement of the dog ears between the retarder blades and the wipers causes those portions of the upper between the front pincers 94 and the side pincers 138 to be stretched about the last. When these upper portions can no longer be stretched the dog ears 294 slip between the wiper bottoms and the retarder blades.

Figure 13:
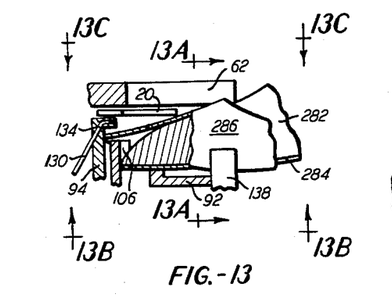
FIG. 13 is a schematic representation of the shoe assembly in the machine at the beginning of the machine cycle.
Figure 13A:
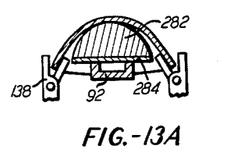
FIG. 13A is a view taken on the line 13A—13A of FIG. 13.
Figure 13B:
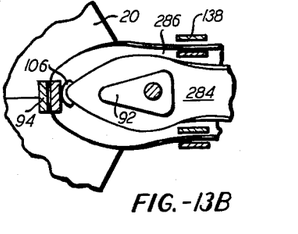
FIG. 13B is a view taken on the line 13B—13B of FIG. 13.
Figure 13C:
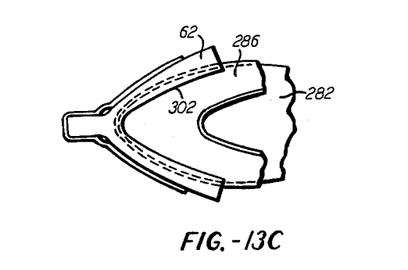
FIG. 13C is a view taken on the line 13C—13C of FIG. 13.

The shoe and last were initially so placed on the toe rest 92 that the edges of the last overlapped the wall 302 of the yoke 62, as indicated in FIG. 13C. When the last is forced upwardly, the yoke wall 302 is initially compressed. When the wall can no longer be compressed, the bight 364 of the yoke flexes rearwardly against the pressure exerted by the spring 286 and the legs 366 flex outwardly against the pressure exerted by the springs 368. Should the shoe be substantially wider than the space between the legs 366, the support arms 66 and spring arms 358 will swing outwardly about the pivot pins 360 and compress the springs 362. During the latter movement, there will be relative swinging movement between the heads 350 and the clevises 352 about the pins 354 and relative swinging movement between the shafts 341 and the flanges 338 about the axes of the sleeves 340. The yieldable pressure exerted by the springs 362, 368 and 386 and the spring arms 358 and the aforementioned swinging movements will cause the yoke 62 to snugly engage the shoe upper 286 and cause the upper to snugly conform to the shape of the last during the upward movement of the last. The springs 378 urge the yoke legs 366 rearwardly during the raising of the shoe to always maintain the yoke bight 364 securely in the socket 336.

Toward the end of the upward movement of the gripping head 76, the motor 202 is actuated to bring the slide 200 from its normal out-of-the-way position to a working position where the toe clamp 214 is above the forepart of the last. This is followed by an actuator of the motors 226 under relatively light pressure to swing the lever 208 about the pivot 210 an amount sufficient to cause the roller 224 to depress the toe clamp holder 212 and bring the toe clamp 214 into engagement with the forepart of the upper and clamp the shoe and last between the toe clamp 214 and the toe rest 92. This is followed by an actuation of the motor 262 to bring the heel clamp 254 to bear against the heel portion of the last.

Figures 16, 16A, 16B:
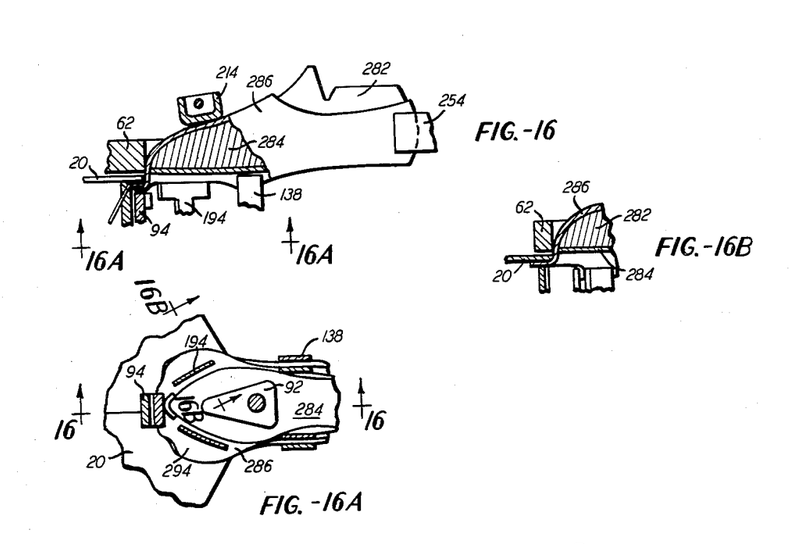
FIG. 16 is a schematic represention of the shoe assembly in the machine just prior to the forward movement of the wipers, taken on the line 16—16 of FIG. 16A.
FIG. 16A is a view taken on the line 16A—16A of FIG. 16.
FIG. 16B is a view taken on the line 16B—16B of FIG. 16A.

The parts now assume the position shown in FIGS. 16, 16A and 16B.

Figure 17:
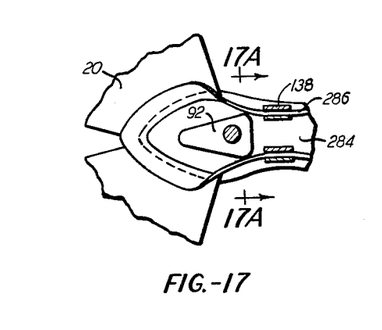
FIG. 17 is a schematic representation of the shoe assembly in the machine during the forward movement of the wipers.
Figure 17A:
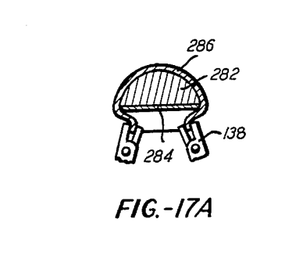
FIG. 17A is a view taken on the line 17A—17A of FIG. 17.

The motors 146 are now actuated to swing the side pincers 138 toward each other beneath the insole. At the same time the motor 36 is actuated to drive the wipers 20 in their working stroke. The location of the pincers 138 beneath the insole 284, as indicated in FIGS. 17 and 17A, lays the margin of the upper 286 at the forepart portions in against the insole, so that the portions of the upper margin engaged by the wipers is of substantially uniform width and the upper margin does not fade away from the wipers as the wipers move in but is laid against the toe portion of the insole with a substantially uniform width. The actuation of the motor 36 causes forward movement of the block 28 at a predetermined speed. Movement of the block, through the linkage comprising members 38, 40, 42, 44, 46 and 48 causes the plate 16 and the wipers 20 carried by the plate to be translated forwardly at a slower speed than the block. Concomitantly with the forward movement of the plate 16 and the wipers 20, the wipers are caused to swing toward each other about the center of curvature of the slots 22 by the links 26 thereby causing the divergent front wiper surfaces 304 (FIG. 4) to move across the edge of the last and commence to wipe or fold the lasting margin of the upper against the insole. The center of curvature of the slots 22 coincide with the point of intersection 306 (FIG. 4) of the surfaces 304, hereafter referred to as the vertex of the wipers.

These movements continue until the stud 58 engages the button on the projection 56 to stop the forward movement of the plate 16. When the plate 16 terminates its forward movement, continued forward movement of the block 28 causes the wipers 20 to swing about the vertex 306 without any forward movement of the vertex. During this portion of the wiper stroke, the levers 40 are caused to swing about the pivots 42 in a direction to move the heads 40 rearwardly in the slots 50 against the resilient force of the motors 54. By this arrangement, the wipers are caused to move forwardly only an amount sufficient to enable the vertex 306 to cross over the toe of the last and wipe the margin of the upper at the toe. By precluding further forward movement of the vertex of the wipers, the wipers do not exert an undesirable stress extending heelwardly of the last as they continue to close in across the insole.

During the forward movement of the block 28, the valve 287 (FIG. 11) is actuated to terminate the flow of pressurized air through the line 288, vent the lines in communication with the line 288 and cause pressurized air to pass from a line 308, through the valve 287 and a line 310 to actuate the motor 108 to cause the front pincers 94 to open and release the toe portion of the lasting margin of the upper. The actuation of the valve 287 also terminates the spraying of the lubricant through the tube 130 forwardly of the jaw 116. In addition, during the forward movement of the block 28, the motors 164 are actuated to open the side pincers 138 and release the forepart portions of the lasting margin of the upper, the pressurized air entering the motors 96 and 150 is shut off so that the front and side pincers are no longer forced downwardly, the motor 70 is actuated to lower the gripping head 92 and the motors 196 are actuated to lower the retarder blades 194 away from the dog ears 294. These movements are so timed that the front pincers 94 and the retarder blades 194 disengage the upper just as the margin of the upper is engaged by the wipers 20, the side pincers 138 are opened just after the wipers cross the side edges of the last, and the gripping head 76 is lowered after the wipers have crossed the bottom of the last. This arrangement enables the wipers to stress the upper margin just as it is released by the front pincers and the retarders, enables the side pincers, which are at this time beneath the insole, to continue to lay the upper margin against the insole until the wipers have started to wipe the margin against the insole, and enables the toe rest 92 to descend with the head 76 after the wipers are beneath the insole, so that the toe clamp 214 will force the lasting margin and upper directly against the wipers.

At the end of the wiper stroke air is supplied to the motor 232 at a higher pressure than the air previously supplied to the motors 226. This actuates the motor 232 to interpose the cam 236 between the rollers 238 and 240 to apply a heavier pressure to the lever 208 than was previously applied by the motors 226 and thus to apply a relatively heavy bedding pressure between the now wiped in lasting margin of the upper and the wipers 20. At the end of a predetermined time interval, the aforementioned locking mechanism for the pedal 280 is released to enable the pedal to return to its original position. This return of the pedal causes the machine control mechanism to bring the machine parts to original position and release the shoe.

Prior to placing the shoe in the machine, cement had been deposited on the toe portion of the insole by an apparatus such as that disclosed in pending application Serial No. 138,135, filed September 14, 1961, or pending application Serial No. 181,682, filed March 22, 1962, now Patent No. 3,157,896. As a result of the pressures generated during the wiping operation and the application of the bedding pressure described above, the wiped-in upper margin and the insole are adhesively bonded to each other through the cement.

Figure 18:
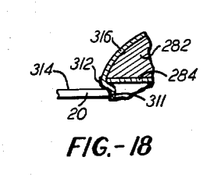
FIG. 18 is a view to an enlarged scale showing the wipers as they engage the upper margin.

As stated above, the spray of lubricant is extruded onto that portion 311 of the outer surface of the upper 286 that is engaged by the wipers 20 during the wiping operation, the sprayed portion upper being indicated by the number 312 in FIG. 18. During the wiping operation the upper surfaces 314 of the wipers 20 engage the sprayed outer surface 311 of the upper to wipe or fold the lasting margin of the upper against the insole. The lubricant 312 at and adjacent the tip of the upper forms a film between the upper surface 311 and the wiper surfaces 314 so as to lessen the coefficient of friction between the surfaces 311 and 314 so that the wiper surfaces 314 will slide readily past the upper surface 311 during the operation of wiping or folding the margin of the upper against the insole. It was found that, in the absence of the film of lubricant, the wipers tend to grab the surface 311 and pull it heelwardly (rightwardly in FIG. 18) thereby causing a tensile stress in the portion 316 of the upper that is above the lasting margin and that is exposed in the completed shoe. This tensile stress frequently caused cracks and breaks in the upper portion 316. By applying the lubricant onto the surface 311, the cracking and breaking has been eliminated. Since the lubricant is sprayed onto a shoe upper during each cycle of the machine, the lubricant eventually works its way onto and coats the wiper surfaces 314. It should be realized that the same results may be achieved by spraying the lubricant directly on the wiper surfaces 314 instead of on the upper surface 311.

Figure 12:
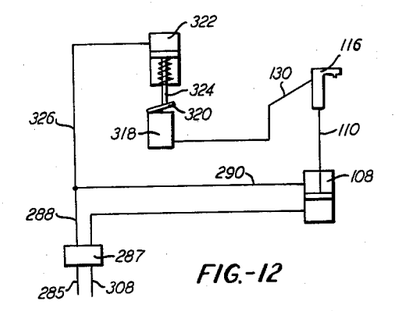
FIG. 12 is a schematic representation of an alternative means for extruding lubricant through the conduit in the pincers jaw.

FIG. 12 shows a modified arrangement for supplying lubricant to the tube 130. In this arrangement the tube 130 is connected to a pump 318. The lubricant is contained in the pump and is forced through the tube 130 upon actuation of a pump lever 320. A spring return air actuated motor 322 is mounted above the lever 320 with its piston rod 324 bearing against the lever. When the motor 108 is actuated by air passing through the line 285, the valve 287, the line 288 and the line 290 to lower the piston rod 110 and the jaw 116 to thereby close the front pinchers 94 on the upper margin, air at the same time passes through a line 326 to actuate the motor 322 to force the lever 320 downwardly and thereby cause the pump 318 to force lubricant through the tube 130 onto the upper surface 312. When the valve 287 is actuated to raise the jaw 116, the line 326 is vented and the spring in the motor 322 raises the piston rod 324 to thereby allow the pump lever 320 to rise to its normal position.

FIGS. 19 through 26 show a different embodiment of the invention wherein the lubricant is applied to the wipers instead of to the margin of the upper. In this version, a bracket 402, secured to the block 14 of the frame 10, mounts a lubricant applying gun 404. The gun 404 includes a block 406 secured to the bracket 402 and a stand 408 bolted to the block 406. A spring return air actuated motor 410 mounted on the stand 408 has a piston rod 412 depending therefrom (see FIGS. 20 and 24). The spring in the motor 410 normally maintains the piston rod 412 in the elevated position shown in FIG. 24. A toothed ratchet wheel 414 is secured to a shaft 415 that extends between and is rotatable in uprights 416 and 418 that are affixed to the block 406. A lever 420 is swingably mounted on the shaft 415. The lever 420 is yieldably urged against the piston rod 412 by a tension spring 422 extending from the lever 420 to a pin 424 secured to the stand 408. A pawl 426, pivotally mounted on the lever 420, is yieldably urged into engagement with the toothed periphery of the ratchet wheel 414 by a tension spring 428 extending between the lever 420 and the pawl. A gear 430 is affixed to the shaft 415 and is in mesh with a gear 432 rotatably mounted in the upright 416. A gear 434, mounted coaxially with the gear 432 to rotate therewith, is in mesh with a gear 436. A shaft 438 (FIG. 21) is rotatably mounted in the uprights 416 and 418, and the gear 436 is rotatably mounted on a hub portion of the shaft 438, the axis of the hub portion 440 being offset or eccentric with respect to the axis of the portions of the shaft 438 that are mounted in the uprights 416 and 418. The gear 436 is constrained against movement lengthwise of the hub portion 440 by bearing on one side against an enlargement 442 on the shaft 438 and by bearing on the other side against the gear 432. A knob 444 is pinned to the end of the shaft 438 opposite the upright 418 (see FIGS. 21 and 23) and a spring urged pin 446 slidably mounted in the knob is adapted to engage a hole 448 in the upright 418. A thimble 450 (FIGS. 19 and 22) threaded into the upright 418 has a brake pad 452 slidably mounted therein that is resiliently urged against the ratchet wheel 414 by a spring 454. The gear 436 is in mesh with a rack that is slidably mounted in the block 406.

Figures 19, 20, 22, 23:
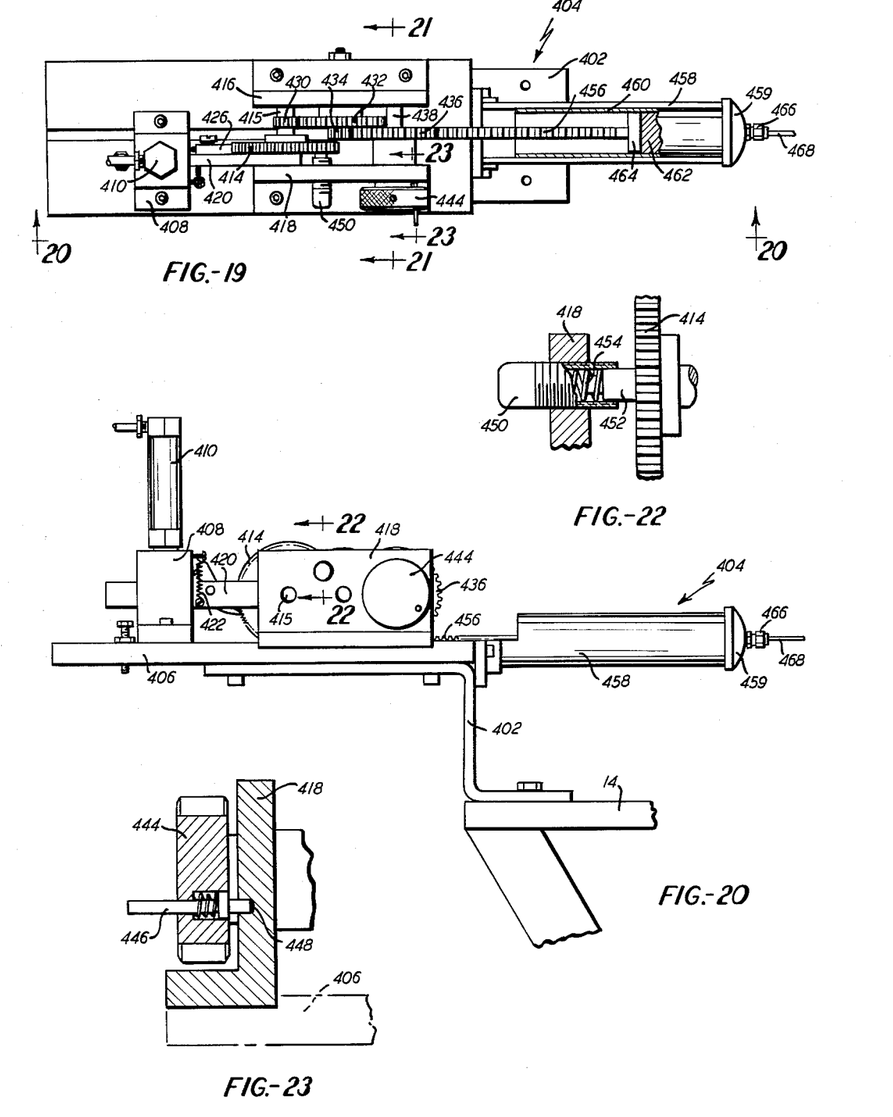
FIG. 19 is a plan view of a lubricant extruding gun.
FIG. 20 is a side elevation taken on the line 20—20 of FIG. 19.
FIG. 22 is a section taken on the line 22—22 of FIG. 20.
FIG. 23 is a section taken on the line 23—23 of FIG. 19.
Figure 21:
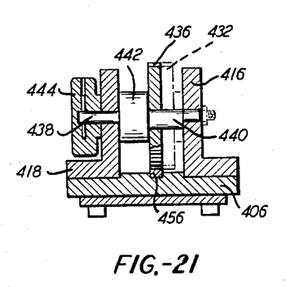
FIG. 21 is a section taken on the line 21—21 of FIG. 19.
Figure 24:
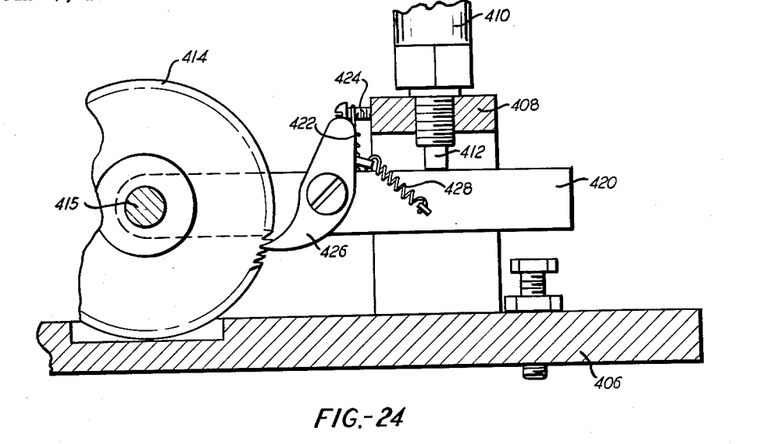
FIG. 24 is a view to an enlarged scale of a ratchet and pawl mechanism in the gun.

Referring to FIGS. 19 and 20, a tubular container 458, having a removable front cap 459, is secured to and extends forwardly of the block 406. The container receives a sleeve 460 that contains a block of lubricant 462. The lubricant 462 is solid but is deformable under pressure so that it may flow in increments out of the sleeve in the manner set forth below. One lubricant that has been found satisfactory is a mixture of 75% by weight of white mineral oil and 25% by weight of paraffin wax, the resultant lubricant having the consistency of heavy grease. The rack 456 has a plunger 464 at its forward end that bears against the block 462. A nipple 466 is secured to the cap 459, and a flexible conduit 468 is affixed to the nipple 466.

Figure 26:
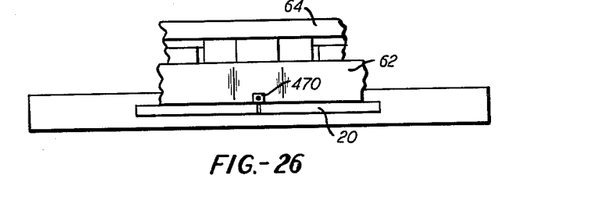
FIG. 26 is a view taken on the line 26—26 of FIG. 25.

Referring to FIGS. 25 and 26, the aforementioned mounting bracket 334 has an L-shaped nozzle 469 secured to and dependent therefrom. The prone leg 470 of the nozzle is received in a recess 472 cut out of the bottom of the yoke bite 364 and is located above the wipers 20. The orifice 474 extending through the nozzle 470 intersects the front of the prone leg 470 above the wipers 20 and just to the rear of the vertex 306 of the wipers with the wipers in their retracted position. The flexible conduit 468 is connected by way of a coupling 476 to a rigid conduit 478, and the conduit 478 is slidably mounted in a hole in the beam 333 and is threaded into the nozzle 469 to communicate with the orifice 474.

When the lubricant is applied to the wipers 20 by the nozzle 470 instead of being applied to the upper margin by way of the port 134 in the jaw 116, aside from the application of the lubricant, the machine performs its operation on the shoe in the same manner as described above. Before the motor 36 is actuated to impart a forward, wiping stroke to the wipers 20, the motor 410 is actuated to cause a glob of lubricant 480 to be extruded through the orifice 474 onto the upper wiper surfaces 314 just to the rear of the wipers vertex 306. Although the specific time in the machine cycle in which the lubricant is deposited is not critical, it has been found desirable to do this after the pincers 94 and 138 have completed stretching the upper about the last, and an actuation of the motor 410 concomitantly with the actuation of the motor 202 to bring the slide 200 from its normal out-of-the-way position to its working position has been found to be a satisfactory arrangement.

Figure 27:
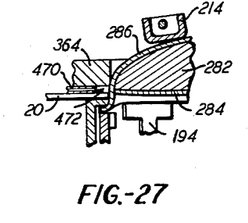
FIG. 27 is a schematic representation of the shoe assembly in the machine showing the lubricant being extruded onto the wipers through the nozzle in the bight of the yoke.
Figure 28:
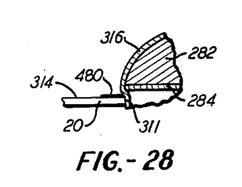
FIG. 28 is a view to an enlarged scale showing the wipers engaging the margin of the upper with a glob of lubricant on the upper surfaces of the wipers.

The actuation of the motor 410 causes the glob of lubricant to be deposited on the wipers in the following manner. Actuation of the motor 410 lowers the piston rod 412 to swing the lever 420 counter-clockwise (FIG. 20) thereby causing the pawl 426 to index the ratchet wheel 414 a predetermined amount about the shaft 415. Indexing of the ratchet wheel, through the gears 430, 432, 434 and 436 causes the rack 456 and plunger 464 to move forwardly a predetermined amount thereby forcing a predetermined quantity of lubricant 462 through the conduits 468 and 478 and the orifice 474 onto the wiper surfaces 314, as indicated in FIG. 27. This takes place during each machine cycle upon each actuation of the motor 410 so that the same predetermined quantity of lubricant is always deposited on the wipers. When the upper wiper surfaces 314 engage the outer surface 311 of the margin of the upper to wipe the margin against the insole as indicated in FIG. 28, the film of lubricant formed between the upper surface 311 and the wiper surfaces 314 provides the same advantages as was described above in connection with the spray of lubricant 312. At the end of each machine cycle, when the motor 36 is actuated to retracted the wipers 20, the motor 410 is vented to cause the spring in the motor to raise the piston rod 412 to its FIG. 24 position thereby enabling the spring 422 to raise the lever 420 and pawl 426 to the FIG. 24 position. During this upward movement of the pawl 426, the pawl slips along the teeth of the ratchet wheel 414 and the brake pad 452 precludes movement of the ratchet wheel. The motion transmitting means between the ratchet wheel 414 and the plunger 464 enables the plunger to move forwardly a small amount in relation to the arc of index of the ratchet wheel 414 to thereby deposit a relatively small glob of lubricant 480 with each increment of advance of the plunger 464. If too small a glob of lubricant is deposited on the wipers, the friction between the wiper surfaces 314 and the margin surface 311 is not decreased sufficiently to prevent cracking of the upper portion 316 (FIG. 28), and if too much lubricant is deposited on the wipers, it tends to accumulate on the wipers and spill over onto other machine parts. Thus it can be seen that the operation of the gun 404 to deposit predetermined quantities of lubricant on the wipers is advantageous.

When the last 282 is raised through the yoke 62 during each machine cycle, the rearward movement of the bight 364 of the yoke 62, described above causes rearward movement of the mounting bracket 334 and the nozzle 470. When this happens, the rigid conduit 478 slides in the opening in the beam 333 (FIG. 25) without affecting the connection between the nozzle orifice 474, the rigid conduit 478 and the flexible conduit 468.

When the machine has gone through enough cycles to deplete the block of lubricant 462 in the sleeve 460, the pin 446 is pulled out of the hole 448 (FIG. 23) and the knob 444 is rotated to thereby swing the eccentric hub portion 440 (FIG. 21) to raise the gear 436 from the rack 456. The rack 456 and plunger 464 may now be moved rearwardly in the container 458, the cap 459 taken off the container, the empty sleeve 460 removed from the container, and a new sleeve filled with lubricant placed in the container.

Although the air line lubricator 124 and the pump 318 have been described as spraying lubricant through the pincers jaw 136 onto the upper margin surface 311 and the gun 404 has been described as extruding lubricant onto the wiper surfaces 314, it should be understood that it is within the purview of the invention to have the air line lubricator or pump spray lubricant onto the wiper surfaces 314 and to have the gun 404 extrude lubricant onto the upper margin surface 311.

It should be understoood that the present disclosure is for the purpose of illustration only and that this invention includes all modifications and equivalents which fall within the scope of the appended claims. It is to be understood that terms such as "bottom," "upper" and "forward" merely define the relative movements and locations of the parts and should be so construed.

I claim:

1. A lasting machine comprising: a support for supporting bottom-down a last having a shoe insole located on its bottom and a shoe upper draped thereon with a selected portion of the upper margin extending downwardly of the insole, said margin portion including a margin surface facing outwardly of the last; wiping means including an upper wiper surface adapted to bear against said margin surface to wipe said margin portion against the insole; a source containing a supply of lubricant in fluent condition; conduit means extending from said source to a position juxtaposed to at least one of said surfaces; means for forcing a quantity of the fluent lubricant from said source through said conduit means whereby the lubricant is applied to those of said surfaces that are juxtaposed to said position; and means operative to thereafter impart such relative movement to the support and wiping means as to cause said wiper surface to intersect said margin surface and wipe said margin portion against the insole.

2. A lasting machine comprising: a support for supporting bottom-down a last having a shoe insole located on its bottom and a shoe upper draped thereon with a selected portion of the upper margin extending downwardly of the insole, said margin portion having a margin surface facing outwardly of the last; wiping means mounted adjacent the support for forward movement, said wiping means including an upper wiper surface adapted to bear against said margin surface to wipe said margin portion against the insole; a source containing a supply of lubricant in fluent condition; conduit means extending from said source to a position juxtaposed to at least one of said surface; means for forcing a quantity of lubricant from said source through said conduit means whereby the lubricant is applied to those of said surfaces that are juxtaposed to said position; and means operative to thereafter impart forward movement to the wiping means to cause said wiper surface to intersect said margin surface and wipe said margin portion against the insole.

3. A lasting machine comprising: wiping means, having an upper surface, mounted for forward movement in a predetermined plane; a support located forwardly of the wiping means for supporting bottom-down a last having a shoe insole located on its bottom and a shoe upper draped about its toe end; a pincers, located below the wiping means and rearwardly of the support, having a lower jaw and an upper jaw; a conduit extending through said upper jaw; means for closing the jaws on the toe portion of the upper margin to causes the jaws to grip the margin; means for imparting downward movement to the pincers to stretch the upper about the toe of the last; means for extruding lubricant through said conduit onto the outer surface of said toe portion of the upper margin; means for locating the support so that the bottom of the insole is located slightly above said upper surface of the wiping means; and means operative to impart forward movement to the wiping means to cause said upper surface of the wiping means to intersect said outer surface of the upper margin and wipe said toe portion of the upper margin against the insole.

4. A lasting machine comprising: wiping means, having an upper surface, mounted for forward movement in a predetermined plane; a support, mounted for heightwise movement, located forwardly of the wiping means for supporting bottom-down a last having a shoe insole located on its bottom and a shoe upper draped about its toe end; means for initially locating the support so as to position the bottom of the insole below said upper surface; a pincers, located below the wiping means and rearwardly of the support, having a lower jaw and an upper jaw; a conduit extending through said upper jaw; means for concomitantly closing the jaws on the toe portion of the upper margin to cause the jaws to grip the margin and for extruding lubricant through said conduit onto the outer surface of said toe portion of the upper margin; means for imparting downward movement to the pincers to stretch the upper about the toe of the last; means for raising the support and pincers in unison an amount sufficient to bring the bottom of the insole above the level of said upper surface; means operative to impart forward movement to the wiping means to cause said upper surface of the wiping means to intersect said outer surface of the upper margin and wipe said toe portion of the upper margin against the insole; and means for opening the jaws to release the margin subsequent to the rise of the support and pincers.

5. A lasting machine comprising: a support for supporting bottom-down a last having a shoe insole located on its bottom and a shoe upper draped thereon with a selected portion of the upper margin extending downwardly of the insole, said margin portion including a margin surface facing outwardly of the last; wiping means including an upper wiper surface adapted to bear against said margin surface to wipe said margin portion against the insole; a source containing a supply of lubricant in fluent condition; conduit means extending from said source to a position juxtaposed to said wiper surface; means for forcing a quantity of the lubricant from said source through said conduit means whereby the lubricant is applied to said wiper surface; and means operative to thereafter impart such relative movement to the support and wiping means as to cause said wiper surface to intersect said margin surface and wipe said margin portion against the insole.

6. A lasting machine comprising: a support for supporting bottom down a last having a shoe insole located on its bottom and a shoe upper draped thereon with the toe portion of the upper margin extending downwardly of the insole, said margin portion having a margin surface facing outwardly of the last; wiping means mounted adjacent the support for forward movement, said wiping means including an upper wiper surface adapted to bear against said margin surface to wipe said margin portion against the insole; a source containing a supply of lubricant in fluent condition; conduit means extending from said source to a position juxtaposed to said wiper surface; means for forcing a quantity of the lubricant from said source through said conduit means whereby the lubricant is applied to said wiper surface; and means operative to thereafter impart forward movement to the wiping means to cause said wiper surface to intersect said margin surface and wipe said margin portion against the insole.

7. The machine according to claim 6 wherein said conduit means comprises: a nozzle located above said wiper surface.

8. A lasting machine comprising: a support, mounted for heightwise movement, for supporting bottom-down a last having a shoe insole located on its bottom and a shoe upper draped thereon with the toe portion of the upper margin extending downwardly of the insole, said margin portion having a margin surface facing outwardly of the last; wiping means mounted adjacent the support for forward movement, said wiping means including an upper wiper surface adapted to bear against said margin surface to wipe said margin portion against the insole; a shoe conforming yoke positioned above the wiping means having a bight and a pair of legs extending forwardly and divergently of the bight; a recess in the bottom of said bight; a nozzle in said recess located above said wiper surface; means for initially locating the support so that the bottom of the insole is below said wiper surface; means for raising the support at least an amount sufficient to bring the bottom of the insole to the level of said wiper surface whereby the yoke snugly conforms the upper to the shape of the last; means for extruding lubricant through said nozzle onto said wiper surface; and means operative to impart forward movement to the wiping means to cause said wiper surface to intersect said margin surface and wipe said margin portion against the insole.

9. A lasting machine according to claim 8 wherein said means for extruding lubricant comprises: a container for holding a supply of the lubricant; a conduit extending from the forward end of the container to the nozzle; a plunger movably mounted in the container adapted to press the lubricant forwardly in the container; a drive member; and motion transmitting means interposed between the drive member and the plunger operable to move the plunger forwardly in the container by an increment in response to actuation of the drive member.

10. A lasting machine for lasting a plurality of shoes in seriatim comprising: a support for supporting bottom-down a last having a shoe insole located on its bottom and a shoe upper draped thereon with a selected portion of the upper margin extending downwardly of the insole, said margin portion including a margin surface facing outwardly of the last; wiping means mounted for relative forward and rearward movement with respect to the support, said wiping means including an upper wiper surface adapted to bear against said margin surface to wipe said margin portion against the insole; drive means operative to impart relative forward and rearward movement of the wiping means with respect to the support in successive cycles whereby during each relative forward movement said wiper surface intersects the said margin surface of a shoe supported on said support and wipes said margin portion against the shoe insole and each relative rearward movement permits the shoe to be removed from the support and another shoe placed thereon; and means for applying a predetermined amount of lubricant to at least one of said surfaces prior to each relative forward movement of the wiping means.

11. A lasting machine for lasting a plurality of shoes in seriatim comprising: a support for supporting bottom-down a last having a shoe insole located on its bottom and a shoe upper draped thereon with the toe portion of the upper margin extending downward of the insole, said margin portions having a margin surface facing outwardly of the last; wiping means mounted adjacent the support for forward and rearward movement, said wiping means including an upper wiper surface adapted to bear against said margin surface to wipe said margin portion against the insole; drive means operative to impart forward and rearward movement of the wiping means in successive cycles whereby during each forward movement said wiper surface intersects the said margin surface of a shoe supported on said support and wipes said margin portion against the shoe insole and each rearward movement permits the shoe to be removed from the support and another shoe placed thereon; a nozzle located in the machine opposite at least one of the said surfaces; and means for extruding a predetermined quantity of lubricant through the nozzle prior to each forward movement of the wiping means.

12. A lasting machine according to claim 11 wherein said lubricant extruding means comprises: a container for holding a supply of the lubricant; a conduit extending from the forward end of the container to the nozzle; a plunger slidably mounted in the container adapted to press the lubricant forwardly in the container; a drive member; motion transmitting means interposed between the drive member and the plunger operable to move the plunger forwardly in the container by a predetermined increment in response to each actuation of the drive member; and means for actuating the drive member prior to each forward movement of the wiping means.

13. A method of lasting a plurality of shoes in seriatim by wiping a selected portion of the margin of each shoe upper against a corresponding portion of each shoe insole comprising: supporting bottom-down a first shoe assembly that includes a last having a shoe insole located on its bottom and a shoe upper draped thereon with the said selected portion of the upper margin extending downwardly of the insole, said margin portion including a margin surface facing outwardly of the last; providing wiping means having an upper surface adapted to bear against said margin surface to wipe said margin portion against the insole; imparting such relative forward movement of the wiping means with respect to said shoe assembly as to cause said wiper surface to intersect said margin surface and wipe said margin portion against the insole; imparting such relative rearward movement of the wiping means with respect to the said shoe assembly as to disengage the wiping means from the said first shoe assembly; removing the first shoe assembly from the shoe support; repeating the aforesaid steps with a second shoe assembly; and applying a predetermined amount of lubricant to at least one of said surfaces while each shoe assembly is supported and prior to each relative forward movement of the wiping means.

14. A method of toe lasting a plurality of shoes in seriatim by wiping the toe portion of the margin of each shoe upper against the toe portion of each shoe insole comprising: supporting bottom-down on a shoe support a first shoe assembly that includes a last having a shoe insole located on its bottom and a shoe upper draped thereon with the toe portion of the upper margin extending downwardly of the insole, said margin portion including a margin surface facing outwardly of the last; providing wiping means having an upper surface adapted to bear against said margin surface to wipe said margin portion against the insole; imparting such forward movement to the wiping means as to cause said wiper surface to intersect said margin surface and wipe said margin portion against the insole; imparting such rearward movement to the wiping means so as to disengage the wiping means from said first shoe assembly; removing the first shoe assembly from the shoe support; repeating the aforesaid steps with a second shoe assembly; and applying a predetermined amount of lubricant to at least one of said surfaces while each shoe assembly is supported and prior to each forward movement of the wiping means.

15. A lasting machine comprising: a support for supporting bottom-down a last having a shoe insole located on its bottom and a shoe upper draped thereon with the toe portion of the upper margin extending downwardly of the insole, said margin portion having a margin surface facing outwardly of the last; wiping means mounted adjacent the support for forward movement, said wiping means including an upper wiper surface adapted to bear against said margin surface to wipe said margin portion against the insole; a nozzle located above said wiper surface; means for extruding lubricant through the nozzle to thereby apply the lubricant to said wiper surface; and means operative to impart forward movement to the wiping means to cause said wiper surface to intersect said margin surface and wipe said margin portion against the insole.

References Cited by the Examiner
UNITED STATES PATENTS

| | | | |
|---|---|---|---|
| 1,035,406 | 8/1912 | Ashton | 12—53.3 X |
| 1,037,018 | 8/1912 | Keighley | 12—10.1 |
| 1,066,781 | 7/1913 | Ashton | 12—53.3 |
| 1,090,182 | 3/1914 | Wentworth | 12—145 |
| 2,235,887 | 3/1941 | Kamborian | 12—145 |
| 2,665,436 | 1/1954 | Jorgensen | 12—10.1 |
| 2,706,823 | 4/1955 | Jorgensen | 12—10.1 |
| 3,009,182 | 11/1961 | Kamborian | 12—145 |
| 3,025,541 | 3/1962 | Weinschenk | 12—10.1 |
| 3,155,994 | 11/1964 | Dent et al. | 12—12.4 X |

FRANK J. COHEN, *Primary Examiner.*

EDWARD V. BENHAM, PATRICK D. LAWSON,
*Assistant Examiners.*